INVENTOR.
Robert K. Sedgwick
BY
Cyril M. Hajewski
Attorney

United States Patent Office 3,151,494
Patented Oct. 6, 1964

3,151,494
BACKLASH ELIMINATOR
Robert K. Sedgwick, Waukesha, Wis., assignor to Kearney & Trecker Corporation, West Allis, Wis., a corporation of Wisconsin
Filed Dec. 3, 1962, Ser. No. 241,767
7 Claims. (Cl. 74—409)

This invention relates generally to apparatus for eliminating backlash and more particularly to an improved simplified arrangement for eliminating backlash between a driving gear of a transmission and a gear driven thereby.

A general object of this invention is to provide an improved backlash eliminating apparatus especially adapted to remove the backlash between a driving element and a driven element.

Still another object of this invention is to provide improved apparatus for applying torque in opposite directions to two gears meshingly engaged with a third gear.

Another object of this invention is to provide apparatus for applying torque in opposite directions to two gears which are both in mesh with a third gear.

Yet another object of this invention is to provide improved apparatus for removing backlash between a pair of gears which is relatively simple in construction, inexpensive to manufacture, facile to adjust, and reliable in operation.

According to this invention, a movable member, such as a rotary table of a machine tool, is connected to be driven in either direction by a reversible motor through a gear transmission. To eliminate backlash between the driving pinion of the transmission and the table gear, a second pinion is provided and is disposed in meshing engagement with the table gear in spaced apart relationship relative to the driving pinion of the transmission. The pinions are supported on a pair of parallel shafts, one of which is connected to be driven by a reversible motor. The input to the one pinion shaft is transmitted to the other pinion shaft by means of a belt. A tensioning force is applied to the belt which causes a torque to be applied in opposite directions to each of the pinion shafts thereby urging their associated pinions into tight meshing engagement with the teeth of the driven gear. As a result, one of the pinions will act as a driver while the other pinion serves as a hold back member and lost motion between the driving pinions and the driven gear is reduced to a minimum.

Figure 1:
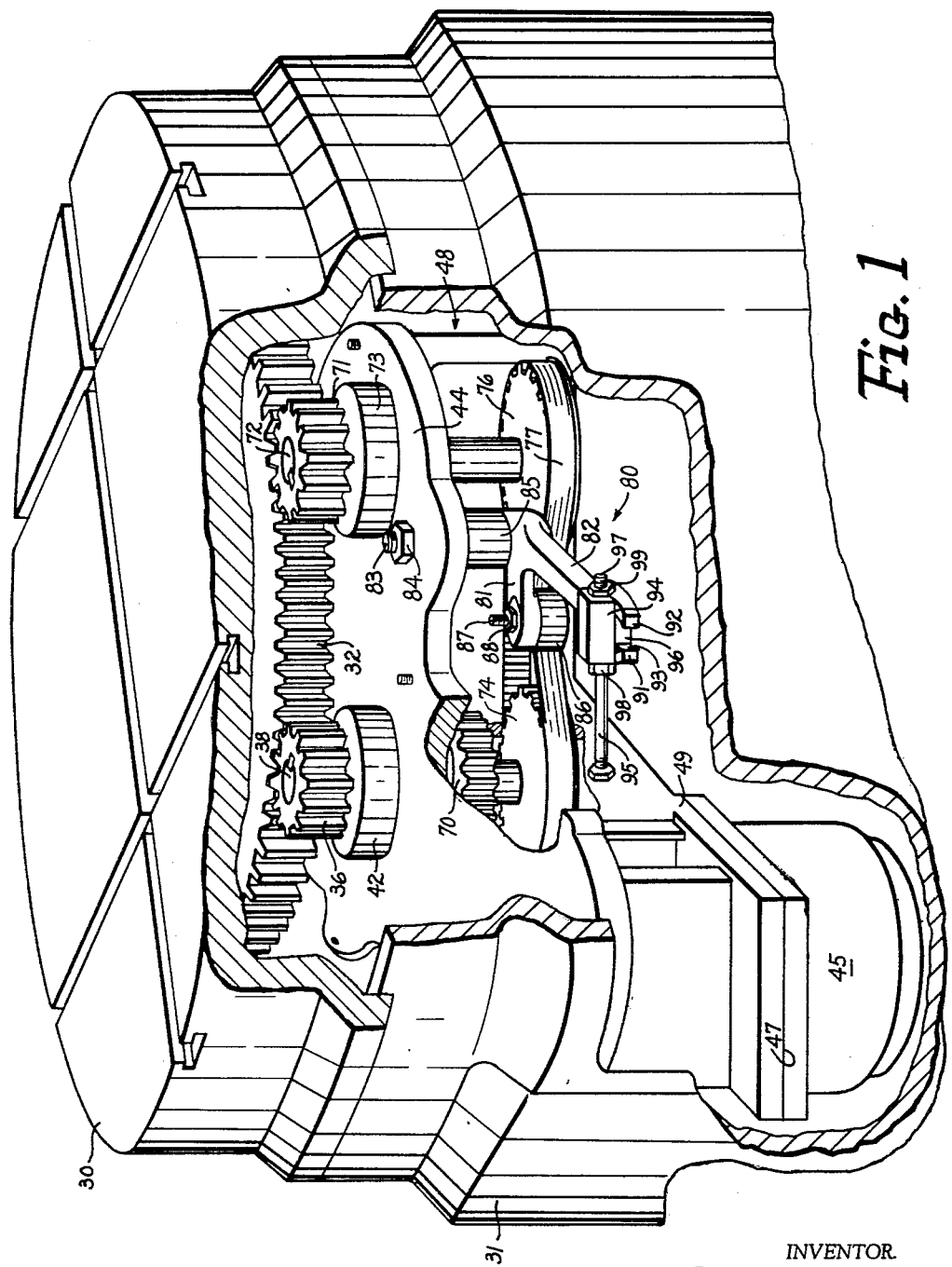
Figure 2:
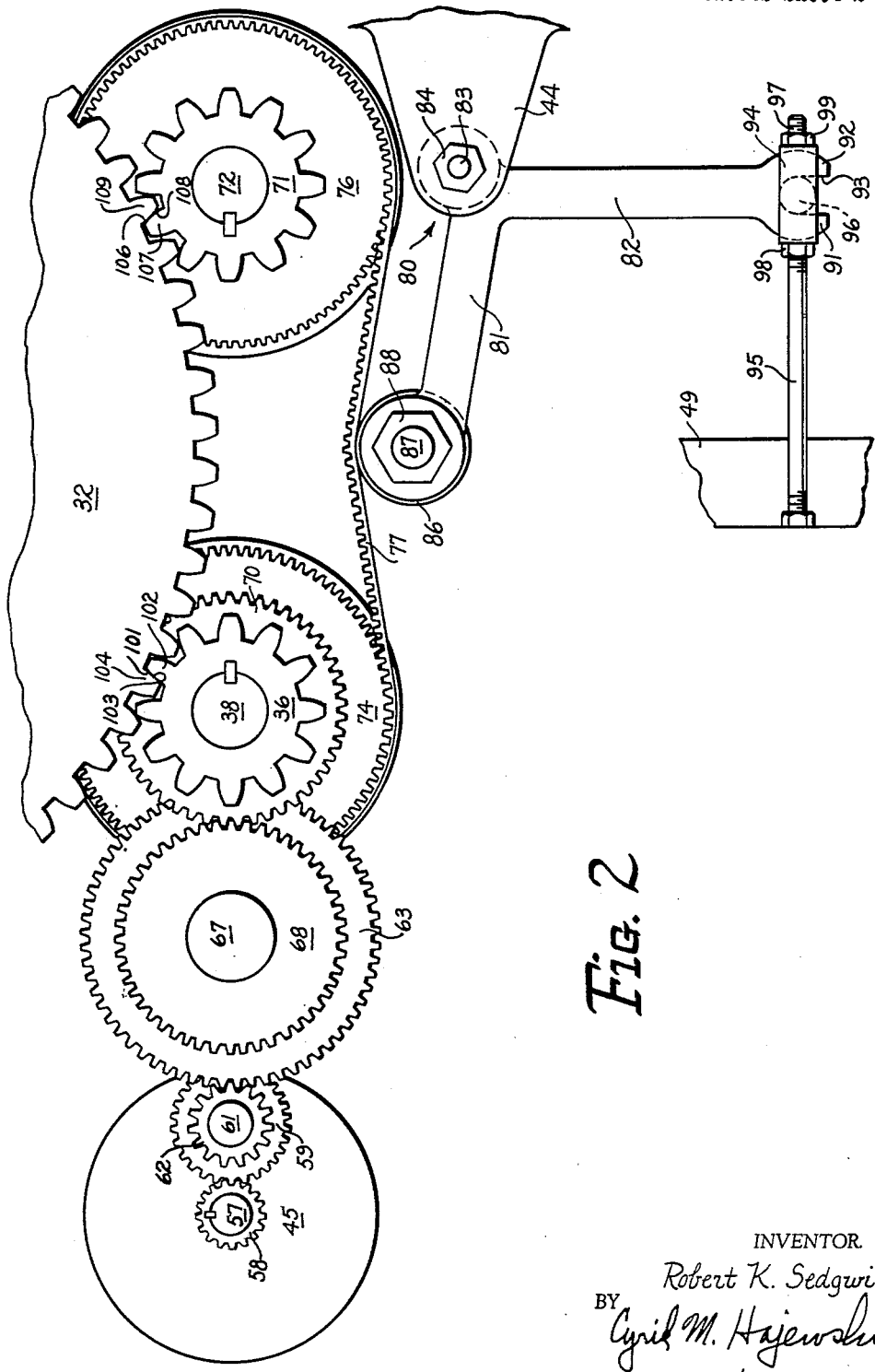

The foregoing objects of the invention, and others which will become apparent from the following detailed description, may be achieved by means of the exemplifying apparatus depicted in and set forth in this specification in connection with the accompanying drawings, in which:

FIGURE 1 is a perspective view of a rotatable table and table base with parts broken away to show the table drive transmission provided with a backlash eliminator incorporating the features of the present invention; and FIG. 2 is an enlarged schematic plan view of the drive transmission showing the backlash eliminating apparatus, with the drive motor and associated gearing being displaced 90° relative to the pinion shaft to which the drive motor is gear connected for clarifying the illustration.

Referring to the drawings and particularly to FIGURE 1, a table 30 is shown rotatably journaled in an upon a supporting base 31 of circular configuration corresponding generally to the configuration of the table. As shown, the table 30 is provided with a relatively large bull gear 32 which is secured to appropriate internal table webs (not shown) in a well known manner, such as by means of recessed cap screws (not shown). A pinion 36 is keyed on the upper end of a vertically disposed pinion shaft 38 and is adapted to meshingly engage the table bull gear 32 for imparting rotational drive thereto. The pinion supporting shaft 38 to which the pinion 36 is keyed, is rotatably supported in a bearing 42 that is disposed in a suitable opening provided in a horizontal top plate 44 of a depending transmission housing 48 mounted within the base 31.

Power for driving the pinion shaft 38 is obtained from a reversible electric motor 45 which is secured to a suitable mounting surface 47 provided on the undersurface of a horizontal lower plate 49 of the transmission housing 48. Power from the motor 45 is transmitted to the pinion shaft 38 by means of gearing, as shown in FIG. 2. As there shown, a relatively small gear 58 is keyed to the motor drive shaft 57 for rotation therewith. The motor gear 58 is adapted to meshingly engage a relatively large gear 59 drivingly secured to a vertical shaft 61 that is rotatably journaled in the transmission housing 48. Rotation of the shaft 61 is transmitted to a gear 62 integrally formed thereon and disposed in meshing engagement with a relatively large intermediate gear 63. This large intermediate gear 63 is spline connected to another vertical shaft 67, likewise journaled in the transmission housing 48, for imparting a rotational drive thereto, which drive is transmitted to a smaller gear 68 integrally formed on the upper end of the shaft 67. The power drive is transmitted from the gear 68 to a gear 70 that is secured to rotate with the pinion shaft 38. Thus, rotational drive in either direction is transmitted from the motor 45 via gears 58 and 59, vertical shaft 61, gears 62 and 63, vertical shaft 67, gears 68 and 70 to the pinion shaft 38 and through the pinion 36 to the table gear 32.

As is well known, the dimensional tolerances in the commercial manufacturing of elements such as the pinion 36 and table gear 32 are such that in normal assembly a slight amount of play may exist between these parts. This condition results in an unsatisfactory precise table drive operation. To eliminate the play or blacklash between the pinion 36 and the table gear 32, a backlash eliminator apparatus has been provided and is incorporated into the table drive. The apparatus provided for eliminating the backlash comprises an anti-backlash pinion 71 which is keyed on the upper end of a vertically disposed pinion shaft 72 and is also adapted to meshingly engage the table gear 32. The pinion supporting shaft 72, to which the anti-backlash pinion 71 is keyed, is rotatably supported in spaced apart parallel relationship relative to the pinion shaft 38 in a bearing 73, carried in the horizontal top plate 44 of the transmission housing 48.

The backlash eliminator of the present invention includes the pinion 71, as previously mentioned, which is adapted to cooperate with the pinion 36 and a simultaneous power drive input is transmitted to both pinions 36 and 71. This is accomplished simply and economically by providing a belt transmission between the two pinion shafts 38 and 72. Thus, the pinion shaft 38, which is gear connected to the drive motor 45, is provided with a pulley 74, having evenly spaced axial grooves formed on its periphery surface, which is secured for rotation with the shaft. Likewise, a cooperating pulley 76, also having evenly spaced axial grooves formed on its peripheral surface, is keyed to the lower end of the pinion shaft 72 for rotation therewith. An endless positive drive belt 77 having teeth formed on its internal surface is entrained about the pulleys 74 and 76 with the teeth of the belt engaging in the peripheral grooves of the pulleys. Such a transmission belt is known in the art as a "timing" belt. It is to be understood that the peripheral grooved pulleys and the "timing" belt arrangement is illustrated as a preferred embodiment for accomplishing positive simultaneous drive of the pinion shafts 38 and 72. However, other types of flexible positive drives may be employed to drive the pinions 38 and 72, if so desired. With the arrangement shown, the rotational drive to the pinion shaft 38 is simultaneously imparted to the pinion shaft 72 so that both of the pinions 36 and 71 are power driven in a rotational movement in the same direction.

For the purpose of this description, it will be assumed that the motor 45 is operated to rotate the drive pinion 36 in a counterclockwise direction, as viewed in FIG. 2, for driving the table 30 in a clockwise direction. In order for the pinion 36 to drive the table 30 to precise desired rotary positions, it is necessary that the faces of the engaged teeth of the pinion in the direction of drive, be securely maintained in contact with the adjacent faces of the cooperating teeth of the table gear 32 to eliminate the backlash between the gear teeth. The present invention provides a relatively simple and inexpensive mechanism for removing such backlash by effecting a tight driving engagement of the teeth of the pinion 36 with the teeth of the table gear 32.

As shown, a bell crank 80, comprising a roller arm 81 and an adjusting arm 82, is pivotally secured to the lower end of a depending bolt 83. The bolt 83 is threadedly fastened in the top plate 44 of the transmission housing 48 and is secured by a nut 84. A spacer 85, carried by the bolt 83 and disposed between the undersurface of the plate 44 and the bell crank 80, serves to effectively position the latter in operative association with respect to the belt 77. A roller 86 is journaled on a depending bolt 87 which is secured to the extending end of the roller arm 81 by a nut 88 and is disposed to engage the outer surface of the belt 77 at a point substantially intermediate of the pulleys 74 and 76. Pivotal movement of the crank 80 in a clockwise direction will serve to move the peripheral surface of the roller 86 into engagement with the outer surface of the belt 77 and apply a tensioning force to the belt. To effect pivotal movement of the bell crank 80 for engaging the roller 86 with the belt 77 the extending end of the adjusting arm 82 is bifurcated to form a pair of spaced apart fingers 91 and 92, the space between the fingers serving as a cam receiving opening 93. A cam body 94 is slidably mounted on the extending end of a horizontally disposed rod 95 that is threadedly secured in the vertical side wall of the transmission housing 48. The cam body 94 is provided with a depending circular cam member 96 which is adapted to be received in the opening 93. The cam member 96 fits snugly within the opening 93 so that any linear movement of the cam body 94 with respect to the rod 95 will immediately impart a movement to the arm 82 of the bell crank 80.

For effecting selective pivotal adjustment of the bell crank 80, the end of the rod 95 on which the cam body 94 is slidable is provided with a thread 97. A pair of nuts 98 and 99 are engaged on the threaded portion 97 of the rod 95 on either side of the cam body 94. By rotating the nuts 98 and 99 in directions to effect their movement into firm engagement with the associated adjacent axial end face of the cam body 94, the bell crank 80 will be held or locked in a selected position. To effect pivotal movement of the bell crank 80 in a clockwise direction for engaging the roller 86 with the belt 77 for applying a tensioning force to the belt, the nut 98 is rotated in a direction to move it out of engagement with the adjacent end face of the cam body 94. This will free the cam body for leftward movement, as viewed in FIG. 2. The nut 99 is then rotated in a direction to effect leftward movement of the cam body. As the cam body 94 is moved leftwardly, its cam 96, which is snugly engaged in the opening 93 formed by the fingers 91 and 92, will force the bell crank 80 to pivot about the bolt 83 in a clockwise direction, to move the roller 86 against the surface of the belt 77 for applying a tensioning force thereto. Such tensioning of the belt 77 causes it to apply a torque to each of the associated pulleys 74 and 76 in opposite directions. Since the roller 86 is in engagement with the belt at a point which is substantially equidistant between the pulleys 74 and 76, the torque applied to each pulley will be of substantially the same magnitude.

The torque which is applied to the pulley 74 will be such as to urge it to rotate in a counterclockwise direction, as viewed in FIG. 2, while the torque applied to the pulley 76 will tend to rotate it in a clockwise direction, as viewed in FIG. 2. These oppositely acting forces that are applied to pulleys 74 and 76 will be transmitted by them to their associated pinion shafts 38 and 72, respectively, and thence to their cooperating pinions 36 and 71, respectively. With the pinion 36 being urged in a counterclockwise direction of rotation, as viewed in FIG. 2, a face 101 of a tooth 102 of the pinion 36 will be positively engaged with a face 103 of a tooth 104 of the table gear 32, as shown in exaggerated detail in FIG. 2. On the other hand, with the pinion 71 being urged in a clockwise direction of rotation, as viewed in FIG. 2, a face 106 of the tooth 107 of the pinion 71 will be positively engaged with a face 108 of a tooth 109 of the table gear 32. With tight positive engagement obtained between the adjacent faces 101 and 103 of the tooth 102 of the pinion 36 and the tooth 104 of the table gear 32, respectively, and also, between the faces 106 and 108 of the tooth 107 of the pinion 71 and the tooth 109 of the table gear 32, respectively, backlash between these members is eliminated.

After the bell crank 80 has been positioned so as to apply the necessary tensioning force to the belt 77 for removing the backlash as described, the bell crank 80 may be locked in the adjusted position by simply rotating the nut 98 relative to the rod 95 so as to move the nut into tight engagement with the adjacent face of the cam body 94. With the nut 98 rotated into tight positive engagement with the adjacent axial end face of the cam body, the opposite axial end face of the cam body will be positively engaged with the nut 99 and the cam body 94 is effectively locked in an adjusted position which thereby operates to maintain the bell crank 80 in the selected adjusted position to retain the roller 86 in a desired force applying engagement with the belt 77.

With the backlash between the pinions 36 and 71 and the teeth of the table gear 32 removed, as previously described, during a rotational movement of the table 30, irrespective of the direction of such movement, the pinions 36 and 71 will be respectively maintained in positive engagement with the opposite faces of the teeth of the table gear 32. Assuming that the motor 45 is operated to effect clockwise rotation of the table drive gear 32, as viewed in FIG. 2, the pinion 36 in tight positive engagement with the right side faces of the table gear teeth, will operate to drive the table gear 32, while the pinion 71 will be retained in tight positive engagement with the left side faces of the table gear teeth for eliminating backlash between the meshing gears.

From the foregoing description taken in conjunction with the drawings it will be apparent that there has been provided a simple and efficient backlash eliminating mechanism which is relatively inexpensive to manufacture and extremely simple to adjust and operate.

Although the illustrative embodiment of the invention herein set forth has been described in considerable detail to make a full disclosure of the invention, it is to be understood that the particular structure described is intended to be illustrative only, and that the various features of the invention may be incorporated in other forms without departing from the spirit and scope of the invention as defined in the subjoined claims.

The principles of this invention having now been fully explained in connection with the foregoing description, I hereby claim as my invention:

1. In a mechanism for eliminating backlash between intermeshing gears;
    a driven gear;
    a first gear in meshing engagement with said driven gear;

a second gear in meshing engagement with said driven gear;

continuous belt interconnecting said first gears for simultaneous rotation in the same direction to actuate said driven gear;

power means connected to effect simultaneous rotation of said first and second gears for actuating said driven gear; and, means mounted in position to engage said belt intermediate said first and second gears for applying a pressure to place said belt in tension while it is revolving with said first and second gears for urging said first and second gears in opposite directions in a rotary movement relative to said driven gear for removing the backlash between said first and second gears and said driven gear.

2. In a drive transmission;
a driven gear;
a pair of spaced apart pinions meshing with said driven gear;
a second pair of gears each connected to rotate with one of said pinions;
driving means interconnecting said second pair of gears for simultaneous uninterrupted rotation; and,
an adjustable mechanism in engagement with said driving means and operable to apply a force to said driving means to thereby urge said pinions in rotary opposite directions for eliminating lost motion between the pinions and the driven gear.

3. In a reversible drive transmission;
a driven gear;
first and second pinions drivingly engaged with said driven gear;
a reversible source of power operably connected to drive one of said pinions;
a timing belt interconnecting both of said pinions for uninterrupted continuous rotation in a manner that the drive imparted to the one pinion by said source of power is transmitted to the other of said pinions; and,
tensioning apparatus for applying a tensioning force to said timing belt which operates to apply torque to each of said pinions in opposite directions to effect positive engagement of said pinions with the teeth of said driven gear in opposite directions, thereby eliminating lost motion between said pinions and the teeth of said driven gear.

4. In a machine tool having a rotatable member;
a driven gear connected to the rotatable member;
a first and second pinion engaged with said driven gear;
a first and second pinion shaft engaged, respectively, with said pinions;
a pair of pulleys engaged respectively with said pinion shafts for rotating said pinions;
a belt drivingly interconnecting said pair of pulleys for uninterrupted cotinuous rotation; and,
tensioning apparatus operable to engage said belt to apply lateral tensioning pressure to said belt for urging said first and second pinions in opposite rotary directions to place the portion of the driven gear that is between said pinions in tension to eliminate backlash between said pinions and said driven gear.

5. In a backlash eliminator for a drive transmission of a movable member of a machine;
a driven gear secured to the movable member;
a first and second pinion engaging said driven gear;

a first and second pinion shaft drivingly supporting said first and second pinions, respectively;
a first and second pulley secured to said first and second pinion shafts respectively;
a timing belt meshingly interconnecting said first and second pulley for simultaneous uninterrupted continuous rotation; and,
tension applying apparatus disposed in engagement with said timing belt and operable to apply a transverse tensioning force to said timing belt,
whereby said timing belt operates to rotate said first pulley and its associated pinion shaft and pinion as a unit in one direction and to rotate said second pulley and its associated pinion shaft and pinion as a unit in a second direction to thereby eliminate blacklash between said first and second pinions and said driven gear.

6. In a drive transmission;
a driven gear;
first and second gears drivingly engaged wth said driven gear;
a reversible source of power operably connected to drive said first gear;
a flexible drive means interconnecting said first and second gears in a manner that the drive imparted to said first gear by said source of power is transmitted to said second gear for simultaneous uninterrupted continuous rotation; and,
lateral force applying means for applying a force to said flexible drive means which operates to urge said first and second gears in opposite directions in a rotary movement relative to said driven gear while they are being rotated by said power source for removing backlash between said first and second gears and said driven gear.

7. In a mechanism for eliminating backlash between intermeshing gears;
a driven gear;
a first gear in meshing engagement with said driven gear;
a second gear in meshing engagement with said driven gear;
flexible means interconnecting said first and second gears for simultaneous uninterrupted rotation;
power means connected to continuously rotate said first gear for actuating said driven gear; and
means connected to continuously urge said first and second gears in opposite directions in a rotary movement relative to said driven gear while they are being continuously rotated by said power means for removing backlash between said first and second gears and said driven gear.

References Cited in the file of this patent

UNITED STATES PATENTS

| | | |
|---|---|---|
| 61,938 | Hichcock | Feb. 12, 1867 |
| 259,190 | Meatyard | June 6, 1882 |
| 639,237 | Hirsch | Dec. 19, 1899 |
| 1,791,747 | Armitage | Feb. 10, 1931 |
| 1,977,289 | Scofield | Oct. 16, 1934 |
| 2,162,282 | Leishman | June 13, 1939 |
| 2,895,342 | Hayhust | July 21, 1959 |
| 3,022,066 | Benes | Feb. 20, 1962 |